(No Model.)

G. F. SHAW.
TRUCK FOR STREET CARS.

No. 544,489.  Patented Aug. 13, 1895.

WITNESSES:
Henry Hall
E. G. Emanuel

INVENTOR:
George F. Shaw,
By Sylvenus J. Walker,
Attorney.

UNITED STATES PATENT OFFICE.

GEORGE F. SHAW, OF DEDHAM, MASSACHUSETTS.

TRUCK FOR STREET-CARS.

SPECIFICATION forming part of Letters Patent No. 544,489, dated August 13, 1895.

Application filed November 1, 1894. Serial No. 527,688. (No model.)

*To all whom it may concern:*

Be it known that I, GEORGE F. SHAW, of Dedham, in the county of Norfolk and State of Massachusetts, have invented an Improvement in Trucks for Street-Cars, of which the following is a specification.

The object of my invention is to provide a truck for street-cars which is adapted to pass around a curve in the track without increase of friction; and it consists in the peculiar novel construction, combination, and arrangement of the wheels and their axles, as hereinafter more fully described, and set forth in the claim hereto annexed.

Reference is made to the drawings hereto annexed, which form a part of this specification.

Figure 1:
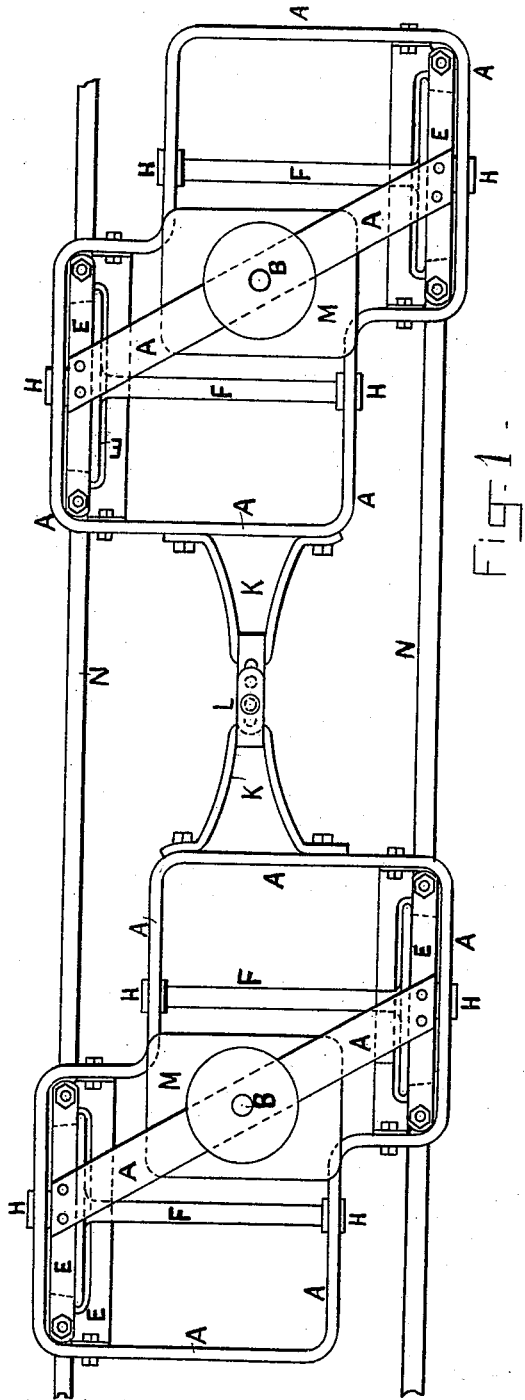
Figure 2:
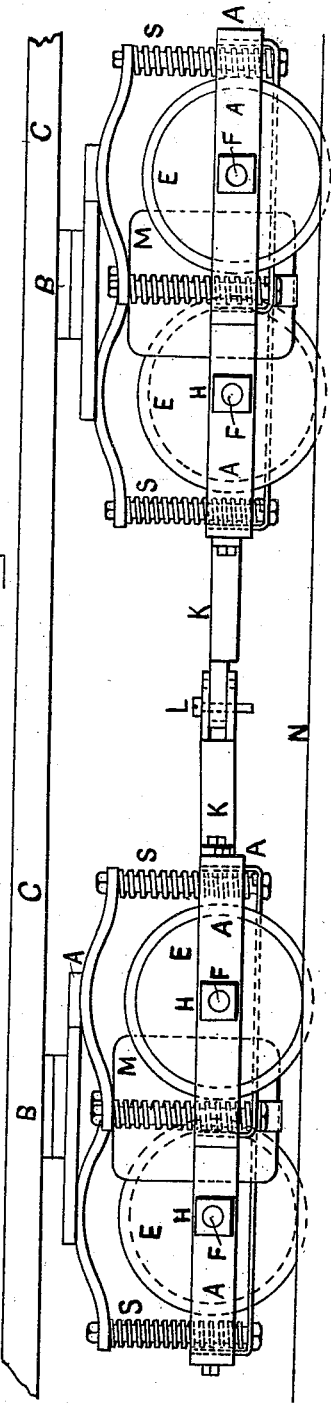

Figure 1 represents a top plan showing a truck or a pair of trucks connected together for street-cars constructed according to my invention. Fig. 2 represents a side elevation of the same as pivoted to the under side of a portion of a car-body.

A represents the truck-frame, pivoted centrally to the car-body C by pivot B, connecting the truck-frame A loosely therewith near each end, as usual, there being two truck-frames, which are connected with each other by inwardly-extended frame-pieces K, which are loosely pivoted together by a central pin L, which passes through a longitudinal slot formed in one of the said frame-pieces K or their pivotal connection, whereby by the turning of one truck-frame A on its pivot B with the car-body C the opposite truck-frame A is simultaneously turned on its pivot B in the opposite direction when the forward truck enters upon a curve in the track N, as heretofore. Now in order to reduce the friction between the inward face of the tracks N and the flanges of the wheels E to a minimum when passing around a curve, I provide each of the said truck-frames A with two wheels E, each wheel E being secured rigidly and separately on each of two axles F, or one wheel only on each axle F, the opposite ends of the said axles F being provided in the said truck-frame A with journal-bearings H, as shown. The axles F need not extend from the wheels E to a point in line with the track or the other wheel on the other axle, but may stop at any convenient or desirable point within the width of the frame less than the extreme width and provided with such a journal-box H, supported in the frame A, as shown, or in any suitable manner desired. By this peculiar construction it will be seen and understood that the said wheels E in each truck-frame A are not opposite each other, each having an independent axle F, which may be geared with the electric motor M, arranged between the axles F F, as shown, or in any suitable manner desired.

Having thus described my invention, I claim—

Trucks for street cars consisting of two frames connected together by bars having a sliding pivotal joint, each of said frames pivoted centrally to the car body and provided with two independent axles, each axle having one wheel only and provided with boxes at each end, one wheel being forward of the pivot to the car body and the other at the rearward of the said pivot in each of said truck frames, as described and for the purposes set forth.

GEORGE F. SHAW.

Witnesses:
SYLVENUS WALKER,
HENRY F. SHAW.